US008880067B2

(12) United States Patent
Atarius et al.

(10) Patent No.: US 8,880,067 B2
(45) Date of Patent: Nov. 4, 2014

(54) CORRELATING REGISTRATIONS ORIGINATING FROM A DEVICE

(75) Inventors: Roozbeh Atarius, San Diego, CA (US); Haipeng Jin, San Diego, CA (US); Arungundram C. Mahendran, San Diego, CA (US); Ramachandran Subramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 495 days.

(21) Appl. No.: 12/512,552

(22) Filed: Jul. 30, 2009

(65) Prior Publication Data

US 2010/0197305 A1 Aug. 5, 2010

Related U.S. Application Data

(60) Provisional application No. 61/087,538, filed on Aug. 8, 2008.

(51) Int. Cl.
*H04W 4/00* (2009.01)
*H04W 60/00* (2009.01)
*H04W 12/06* (2009.01)
*H04L 29/06* (2006.01)

(52) U.S. Cl.
CPC ........... *H04L 65/1016* (2013.01); *H04W 12/06* (2013.01); *H04L 63/08* (2013.01); *H04L 65/1073* (2013.01); *H04W 60/005* (2013.01)
USPC ..................... 455/435.1; 455/410; 455/552.1; 370/338; 370/352

(58) Field of Classification Search
USPC ................. 455/435.1–435.3, 436.443, 452.1, 455/432.1–435.3, 410–411, 552.1; 370/331–338, 466, 351–356
See application file for complete search history.

(56) References Cited

U.S. PATENT DOCUMENTS

| 5,289,527 | A  | * | 2/1994  | Tiedemann, Jr. | ........... 455/435.1 |
| 5,764,730 | A  | * | 6/1998  | Rabe et al. | ..................... 455/403 |
| 6,311,063 | B1 | * | 10/2001 | Valliani et al. | ................ 455/433 |
| 6,778,828 | B1 | * | 8/2004  | Chander et al. | ............ 455/435.1 |
| 6,871,070 | B2 | * | 3/2005  | Ejzak | .......................... 455/435.1 |
| 7,453,876 | B2 | * | 11/2008 | Hua et al. | ...................... 370/392 |

(Continued)

FOREIGN PATENT DOCUMENTS

| DE | 102006026929 | 12/2007 |
| JP | 2005521335 A | 7/2005 |

(Continued)

OTHER PUBLICATIONS

3GPP Qualcomm Europe: "Allow Multiple Registrations in Rel. 8"; C1-081128, Mobile Comptetence Centre; 650, Route des Lucioles; F-06921 Sophia-Antipolis Cedex; France, vol. CT WG1, No. Jeju Island; Mar. 31, 2008, XP050028418.*

(Continued)

*Primary Examiner* — Sharad Rampuria
(74) *Attorney, Agent, or Firm* — Ashish L. Patel

(57) ABSTRACT

Systems and methods for correlating multiple registrations from a single device are disclosed. A private ID used in an prior registration may be used to obtain subsequent private IDs. The subsequent private IDs may be used in subsequent registrations. An instance ID from an prior registration may be used in conjunction with different registration IDs in subsequent registrations.

53 Claims, 10 Drawing Sheets

(56) References Cited

U.S. PATENT DOCUMENTS

| | | | |
|---|---|---|---|
| 7,567,796 B2* | 7/2009 | Tammi et al. | 455/411 |
| 8,265,083 B1* | 9/2012 | Cannon et al. | 370/395.52 |
| 8,457,046 B2* | 6/2013 | Bogner et al. | 370/328 |
| 8,611,898 B2* | 12/2013 | Song et al. | 455/435.1 |
| 2001/0034247 A1* | 10/2001 | Namiki | 455/558 |
| 2004/0185848 A1* | 9/2004 | Phan-Anh et al. | 455/435.1 |
| 2004/0193712 A1* | 9/2004 | Benenati et al. | 709/225 |
| 2004/0219948 A1* | 11/2004 | Jones et al. | 455/552.1 |
| 2005/0009520 A1* | 1/2005 | Herrero et al. | 455/435.1 |
| 2005/0037746 A1* | 2/2005 | Ramalho et al. | 455/422.1 |
| 2005/0239445 A1* | 10/2005 | Karaoguz et al. | 455/414.1 |
| 2006/0153162 A1* | 7/2006 | Croak et al. | 370/352 |
| 2007/0274524 A1* | 11/2007 | Ksontini et al. | 380/270 |
| 2007/0280154 A1* | 12/2007 | Gupta et al. | 370/328 |
| 2008/0089290 A1* | 4/2008 | Coulas et al. | 370/331 |
| 2008/0175253 A1* | 7/2008 | Rahman et al. | 370/395.52 |
| 2010/0232368 A1 | 9/2010 | Bogner et al. | |

FOREIGN PATENT DOCUMENTS

| | | | |
|---|---|---|---|
| JP | 2005521349 A | | 7/2005 |
| JP | 2007504777 A | | 3/2007 |
| RU | 2005134227 A | | 5/2007 |
| WO | 03005669 A1 | | 1/2003 |
| WO | 03081937 A1 | | 10/2003 |
| WO | WO03081876 A1 | | 10/2003 |
| WO | 2004102900 A1 | | 11/2004 |

OTHER PUBLICATIONS

International Search Report and Written Opinion—PCT/US09/053001, International Search Authority—European Patent Office, Apr. 27, 2010.

Qualcomm Europe: "Allow Multiple Registrations in Rel 8" 3GPP Draft; C1-081128, 3rd Generation Partnership Project (3GPP), Mobile Competence Centre; 650 Route Des Lucioles; F-06921 Sophia-Antipolis Cedex; France, vol. CT WG1, No. Jeju Island; Mar. 31, 2008, XP050028418, pp. 26-27. 3GPP TSG CT WG1 Meeting #52.

3GPP TS 24.229 version 8.7.0 Release 8; ETSI TS 124 229 V8 7.0 (Mar. 2009) pp. 139-143.

Change Request 24.229, 3GPP TSG CT WG1 Meeting #52, Apr. 2008, Rev. 1 Current version 8.3.0, p. 26-27.

Change Request 24.229, 3GPP TSG CT WG1 Meeting #52, Apr. 2008, Rev.1 Current version 8.3.0, p. 26-27.

Taiwan Search Report—TW098126763—TIPO—Sep. 7, 2012.

* cited by examiner

| Instance ID | Registration ID1 |

| Instance ID | Registration ID2 |

| Instance ID | Registration ID3 |

| Instance ID | Registration ID4 |

| Instance ID | Registration IDN |

CORRELATING REGISTRATIONS ORIGINATING FROM A DEVICE

RELATED APPLICATIONS

The present Application for patent claims priority to U.S. Provisional Application No. 61/087,538 entitled "Correlating IMS Registrations Originating from a Single UE," filed Aug. 8, 2008, which is hereby expressly incorporated by reference in its entirety.

BACKGROUND

1. Field of the Invention

The present invention generally relates to communications. In particular, it relates to resource management of registrations in multi-communication sessions.

2. Relevant Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

A variety of services and applications may be made available to users of a wireless communication system. Services (e.g., streaming video, streaming music, and news feeds) and applications (e.g., online games) may require a user of the wireless communication system to register with a server or a provider of such services and applications. For example, the user may wish to access a streaming video feed. In order to access the streaming video feed, the user may provide an identifier which may allow a server within the wireless communication to determine if the user may access to the streaming video feed. In another example, the user may register with a server before playing an online game. The user may be required to register with a server or a service provider for each service or application in use. The multiple registrations may affect the performance and/or the bandwidth of the wireless communication system. Adjusting the method in which users perform multiple registrations to minimize the affect on the performance and/or the bandwidth of the wireless communication system is desirable.

SUMMARY OF THE INVENTION

In one embodiment, the invention provides a wireless communication apparatus operable in a communication system. The wireless communication apparatus comprises a registration circuit configured to obtain a first identifier comprising a first identification portion and a second identification portion. The first identifier is used in a prior registration. The registration circuit is further configured to obtain a second identifier. The second identifier comprises at least one of the first identification portion and the second identification portion, and further comprises a third identification portion. The second identifier is used in an additional registration. The wireless apparatus further comprises a receiver configured to receive at least one of voice, video, and multimedia data and a transmitter configured to transmit the first identifier and the second identifier to a network server.

In another embodiment, the invention provides a wireless communication apparatus operable in a communication system. The wireless communication apparatus comprises means for obtaining a first identifier comprising a first identification portion and a second identification portion. The first identifier is used in a prior registration. The wireless communication apparatus further comprises means for obtaining a second identifier. The second identifier comprises at least one of the first identification portion and the second identification portion, and further comprises a third identification portion. The second identifier is used in an additional registration. The wireless communication apparatus further comprises means for receiving at least one of voice, video, and multimedia data and means for transmitting the first identifier and the second identifier to a network server.

In yet another embodiment, the invention provides a method for registering a wireless apparatus. The method comprises obtaining a first identifier comprising a first identification portion and a second identification portion. The first identifier is used in a prior registration. The method further comprises obtaining a second identifier. The second identifier comprises at least one of the first identification portion and the second identification portion, and further comprises a third identification portion. The second identifier is used in an additional registration. The method further comprises transmitting the first identifier and the second identifier to a network server.

In a further embodiment, the invention provides a computer program product, which comprises a computer-readable medium. The computer-readable medium comprises code for causing a computer to obtain a first identifier comprising a first identification portion and a second identification portion. The first identifier is used in a prior registration. The computer-readable medium further comprises code for causing a computer to obtain a second identifier. The second identifier comprises at least one of the first identification portion and the second identification portion, and further comprises a third identification portion. The second identifier is used in an additional registration. The computer readable medium further comprises code for causing a computer to transmit the first identifier and the second identifier to a network server.

In one embodiment, the invention provides a communication apparatus operable in a communication system. The communication apparatus comprises a registration circuit configured to receive a first identifier comprising a first identification portion and a second identification portion. The first identifier is used in a prior registration. The registration circuit is further configured to receive a second identifier comprising a third identification portion and a fourth identification portion. The second identifier is used in an additional registration. The registration circuit is further configured to verify that the third identification portion comprises at least one of the first identification portion and the second identification portion. The communication apparatus further comprises a transmitter configured to transmit data indicative of the verification.

In another embodiment, the invention provides a communication apparatus operable in a communication system. The communication apparatus comprises means for receiving a first identifier comprising a first identification portion and a second identification portion. The first identifier is used in a prior registration. The communication apparatus further comprises means for receiving a second identifier. The second identifier comprises a third identification portion and a fourth identification portion. The second identifier is used in an additional registration, and means for verifying that the third identification portion comprises at least one of the first identification portion and the second identification portion. The wireless communication apparatus further comprises means for transmitting data indicative of the verification.

In yet another embodiment, the invention provides a method for registering a wireless apparatus. The method comprises receiving a first identifier comprising a first identification portion and a second identification portion. The first identifier is used in a prior registration. The method further comprises receiving a second identifier. The second identifier comprises a third identification portion and a fourth identification portion. The second identifier is used in an additional registration, and verifying that the third identification portion comprises at least one of the first identification portion and the second identification portion. The method further comprises transmitting data indicative of the verification.

In a further embodiment, the invention provides a computer program product, which comprises computer-readable medium. The computer-readable medium comprises code for causing a computer to obtain a first identifier comprising a first identification portion and a second identification portion. The first identifier is used in a prior registration. The computer-readable medium further comprises code for causing a computer to obtain a second identifier comprising a third identification portion and a fourth identification portion. The second identifier is used in an additional registration. The computer readable medium further comprises code for causing a computer to verify that the third identification portion comprises at least one of the first identification portion and the second identification portion. The computer-readable medium further comprises code for causing a computer to transmit data indicative of the verification.

In one embodiment, the invention provides a communication apparatus operable in a communication system. The communication apparatus comprises a receiver configured to receive a current registration request. The current registration request comprises a current public user identity, a current instance ID, and a current registration ID. The communication apparatus further comprises a registration circuit configured to determine whether at least one previous registration was successful. The registration circuit is further configured to determine whether there is at least one public user identity other than the current public user identity The at least one public user identity being associated with a prior instance ID and a prior registration ID. The registration circuit is further configured to determine whether the at least one previous registration has expired. The registration circuit is further configured to determine whether the current instance ID is the same as the prior instance ID. The registration circuit is further configured to determine whether the current registration ID is the same as the prior registration ID. The registration circuit is further configured to initiate a deregistration procedure for the at least one previously registered public user identity being associated with the prior instance ID and the prior registration ID.

In another embodiment, the invention provides communication apparatus operable in a communication system. The communication apparatus comprises means for receiving a current registration request, wherein the current registration request comprises a current public user identity, a current instance ID, and a current registration ID. The communication apparatus further comprises means for determining whether at least one previous registration was successful. The communication apparatus further comprises means for determining whether there is at least one public user identity other than the current public user identity, the at least one public user identity being associated with a prior instance ID and a prior registration ID. The communication apparatus further comprises means for determining whether the at least one previous registration has expired. The communication apparatus further comprises means for determining whether the current instance ID is the same as the prior instance ID. The communication apparatus further comprises means for determining whether the current registration ID is the same as the prior registration ID. The communication apparatus further comprises means for initiating a deregistration procedure for the at least one previously registered public user identity being associated with the prior instance ID and the prior registration ID.

In yet another embodiment, the invention provides a method for registering a wireless apparatus. The method comprises receiving a current registration request, wherein the current registration request comprises a current public user identity, a current instance ID, and a current registration ID. The method further comprises determining whether at least one previous registration was successful. The method further comprises determining whether there is at least one public user identity other than the current public user identity, the at least one public user identity being associated with a prior instance ID and a prior registration ID. The method further comprises determining whether the at least one previous registration has expired. The method further comprises determining whether the current instance ID is the same as the prior instance ID. The method further comprises determining whether the current registration ID is the same as the prior registration ID. The method further comprises initiating a deregistration procedure for the at least one previously registered public user identity being associated with the prior instance ID and the prior registration ID.

In a further embodiment, the invention provides a computer program product, comprising a computer-readable medium. The computer readable medium comprises code for causing a computer to receive a current registration request, wherein the current registration request comprises a current public user identity, a current instance ID, and a current registration ID. The computer readable medium further comprises code for causing a computer to determine whether at least one previous registration was successful. The computer readable medium further comprises code for causing a computer to determine whether there is at least one public user identity other than the current public user identity, the at least one public user identity being associated with a prior instance ID and a prior registration ID. The computer readable medium further comprises code for causing a computer to determine whether the at least one previous registration has expired. The computer readable medium further comprises code for causing a computer to determine whether the current instance ID is the same as the prior instance ID. The computer readable medium further comprises code for causing a computer to determine whether the current registration ID is the same as the prior registration ID. The computer readable medium further comprises code for causing a computer to initiate a deregistration procedure for the at least one previously registered public user identity being associated with the prior instance ID and the prior registration ID.

BRIEF DESCRIPTION OF THE DRAWINGS

FIG. 8 illustrates exemplary instance and registration IDs which may be used by the communication system shown in FIG. 2.

DETAILED DESCRIPTION OF CERTAIN EMBODIMENTS

Figure 1:
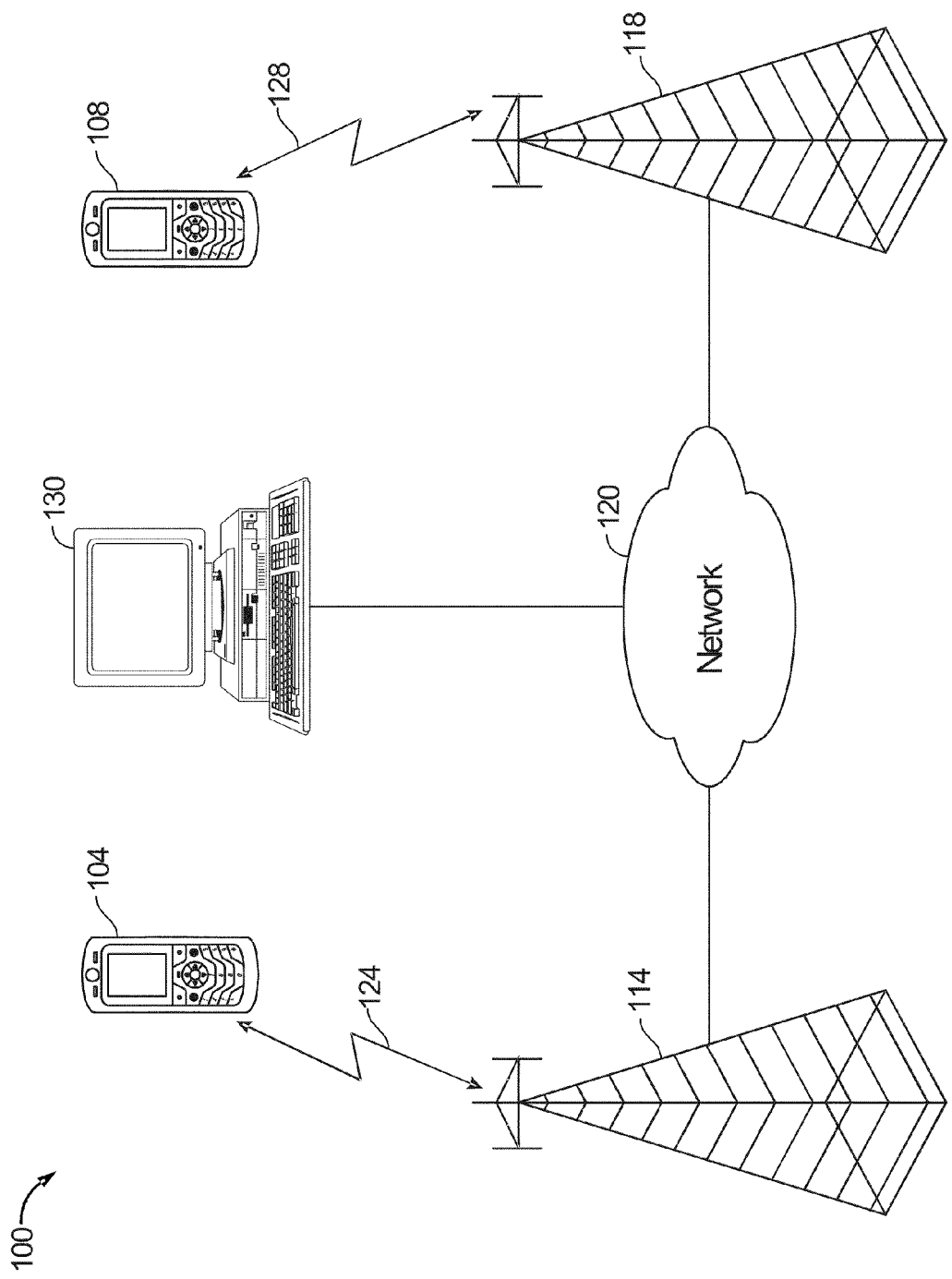
FIG. 1 illustrates an exemplary communication system.

The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein. The word "exemplary" is used herein to mean "serving as an example, instance, or illustration." Any embodiment described herein as "exemplary" is not necessarily to be construed as preferred or advantageous over other embodiments. The terms "networks" and "systems" are often used interchangeably.

The systems and techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Terminologies associated with different technologies may vary. For example, depending on the technology considered, a User Equipment (UE) used in the WCDMA standards may sometimes be called an Access Terminal (AT), a user terminal, a Mobile Station (MS), a subscriber unit, a User Equipment (UE), etc. Likewise, an Access Network (AN) used in the WCDMA standards may sometimes be called an access point, an Access Node (AN), a Node B, a Base Station (BS), a cell tower and so forth. It should here be noted that different terminologies apply to different technologies when applicable.

Furthermore, in one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In one embodiment, the software instructions may be transmitted from a website, server, or other remote source using a coaxial cable, fiber optic cable, twisted pair, digital subscriber line (DSL), or wireless technologies such as infrared, radio, and wireless technologies such as infrared, radio, and microwave.

FIG. 1 illustrates an exemplary communication system 100. The communication system 100 provides two UEs 104 and 108, two ANs 114 and 118, a network 120, and a computing device 130. The UE 104 is in communication (e.g., transmitting and/or receiving data) with the AN 114. The UE 104 may communicate with AN 114 using a communication channel 124. The communication channel 124 may be at least one of a wireless communication channel (e.g., a WCDMA channel) or a wired communication channel (e.g., an Ethernet channel). The AN 114 is connected to a network 120. The AN 114 may be connected to network 120 using at least one of a wireless communication channel or a wired communication channel. The UE 108 is in communication with the AN 118, similar to UE 104 and AN 118. The UE 108 may communicate with AN 118 using a communication channel 128. The AN 118 is also connected to the network 120, similar to AN 114. The computing device 130 is connected to the network 120 using at least one of a wireless communication channel or a wired communication channel. In one embodiment, the communication system 100 may be used to transmit and/or receive data (e.g., voice, video, sound, multimedia) between the UE 104 and the UE 108. For example, the UE 104 may initiate a phone call to UE 108. In another embodiment, the communication system 100 may be used to transmit and/or receive data between UE 104 or UE 108, and the computing device 130. For example, the UE 104 may play streaming music provided by the computing device 130.

The UEs 104 and 108 may comprise a variety of electronic devices, including but not limited to, cellular phones, smartphones, personal digital assistants (PDAs), multimedia devices and other computing devices. The ANs 114 and 118 may comprise a variety of transceivers, including but not limited to, a Node B, a Base Station (BS), a cell tower, a femto cell, and a wireless access point (e.g., a 802.11 router).

The network 130 may comprise any type of electronically connected group of computers and/or devices including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), or Bluetooth (IEEE 802.15.1). Note that computing devices may be desktop, server, portable, hand-held, set-top, or any other desired type of configuration. As used herein, the network 130 includes network variations such as the public Internet, a private network within the Internet, a secure network within the Internet, a private network, a public network, a value-added network, an intranet, and the like. In certain embodiments, network 130 may also comprise a virtual private network (VPN).

Figure 2:
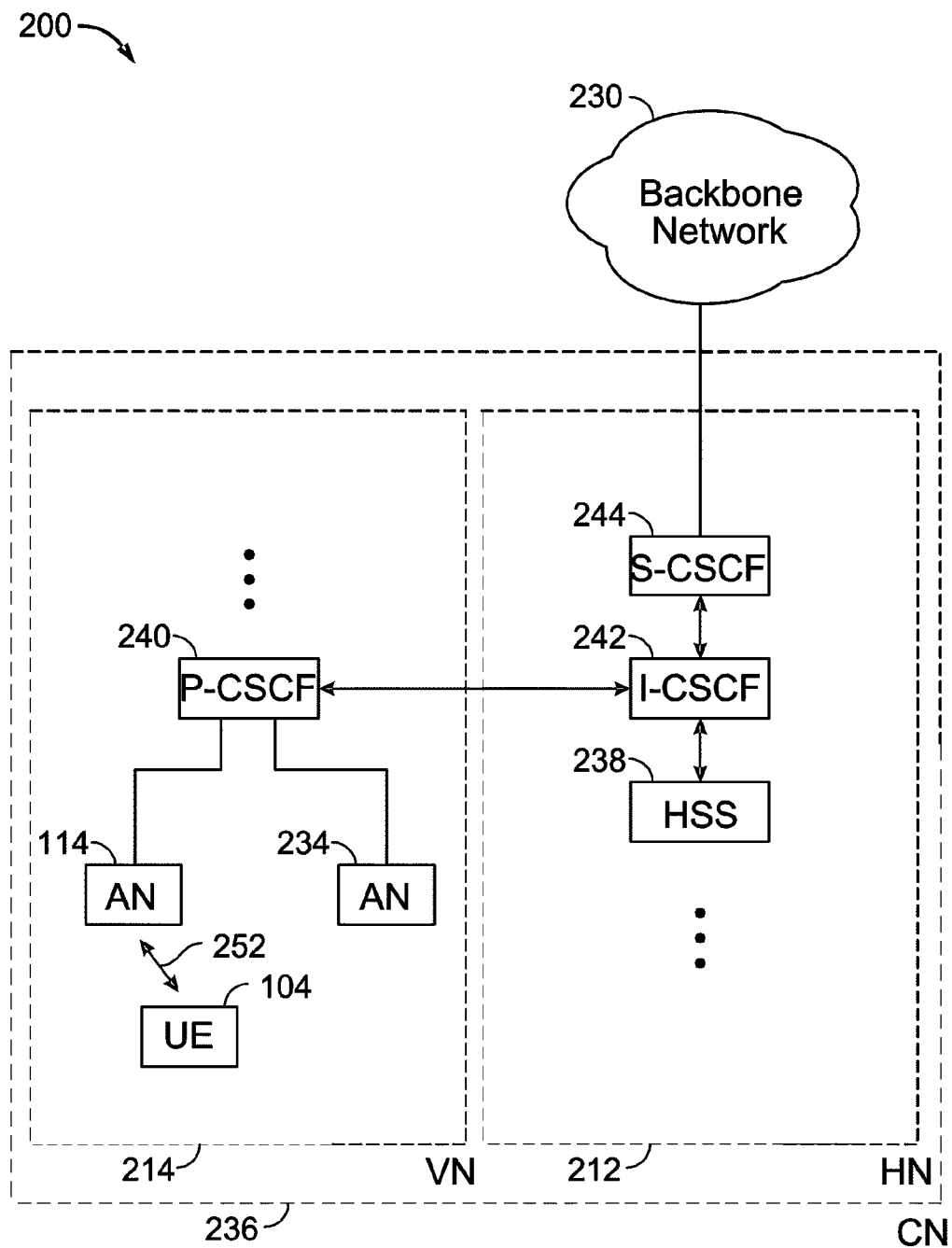
FIG. 2 is a functional block diagram of at least a portion of the communication system of FIG. 1.

FIG. 2 is a functional block diagram of a system 200 which illustrates at least a portion of the communication system 100 of FIG. 1. The system 200 may provide multimedia services to the UE 104, under the IP (Internet Protocol) Multimedia System (IMS) standard and may be used to communicate data (e.g., voice and video data) to and from the UE 104. The IMS standard is a standard for delivering IP based multimedia services to UEs, such as UE 104. As discussed above, streaming music and streaming video are examples of IP based multimedia services. The system 200 comprises a Core Network (CN) 236 which in turn comprises a Home Network (HN) 212 and a Visitor Network (VN) 214. The HN 212 comprises, among other things, a Home Subscriber Server (HSS) 238, an Interrogating Call Session Control Function (I-CSCF) 242, and a Serving Call Session Control Function (S-CSCF) 244. The VN 214 comprises AN 114, AN 234, UE 104 and a Proxy Call Session Control Function (P-CSCF) 240.

The UE 104 is located in the VN 214 and is in communication with AN 114 via a communication session 252. The communication session 252 may use a wired and/or wireless communication channel as discussed above in conjunction with FIG. 1. The UE 104 may access multimedia services via the IMS standard. In order to access multimedia services, the UE 104 may provide a registration information to a server (not shown in FIG. 2), which may be located in the backbone network 230. The registration information from the UE 104 is forwarded to the AN 114 via the communication session 252. The AN 112 then forwards the registration information to the P-CSCF 240. The AN 114 and the P-CSCF 240 may be connected by a wireless and/or a wired communication channel. In one embodiment, the P-CSCF 240 may comprise a proxy server and may be responsible for forwarding the registration information to the I-CSCF 242. In another embodiment, the P-CSCF may also communicate data used for an IP based multimedia service to the UE 104 via AN 114. For example, the streaming music being communicated to the UE 104 may be sent to the P-CSCF 240 from the HN 212 and the P-CSCF then forwards the streaming music to the UE 104 via the AN 114.

After receiving the registration information originating from the UE 104, the P-CSCF 240 may forward the registration information from the VN 214 to the I-CSCF 242. The P-CSCF 240 and the I-CSCF 242 may be connected using a wired and/or wireless communication channel. After receiving the registration information from the P-CSCF 240, the I-CSCF 242 may communicate with the HSS 238, to verify the information within the registration information (e.g., user identity). For example, the I-CSCF 242 may use the registration information provided by the UE 104 to determine if the UE 104 may access to the streaming music service. In another example, the HSS 238 may verify the information within the registration information and communicate the result of the verification to the I-CSCF 242. The HSS 238 and the I-CSCF 242 may be connected using a wired and/or wireless interface.

After the I-CSCF 242 verifies the registration information using HSS 238, the I-CSCF 242 may forward the registration information to the S-CSCF 244. The I-CSCF 242 and the S-CSCF 244 may be connected using a wired and/or wireless communication channel. The S-CSCF 244 may communicate with the backbone network 230, via a wired and/or wireless communication to access an application server (not shown in FIG. 2). The application server (not shown in FIG. 2) may provide the IP based multimedia service requested by the UE 104. The data for the IP based multimedia service (e.g., the streaming video or the streaming music) is transmitted from the application server (not shown in FIG. 2), to the S-CSCF 244, to the I-CSCF 242, to the P-CSCF 240, and to the UE 104 via AN 114 and the communication session 252.

In one embodiment, the P-CSCF 240 may reside in the HN 212. In another embodiment, the P-CSCF 240 may reside in the VN 214, as shown in FIG. 2. In the exemplary embodiment shown in FIG. 2, the VN 214 is relied upon for the description of establishing communication sessions, such as the communication session 252. As such, the P-CSCF 240 is shown inside the VN 214.

While the foregoing example has been described in connection with the IMS standard, such examples are used for the purpose of explanation and should not be interpreted as limiting. The present systems and methods are equally applicable to other communication standards. In another embodiment, the system 200 is capable of providing IP based multimedia services to the UE 104 using other communication standards.

Figure 3:
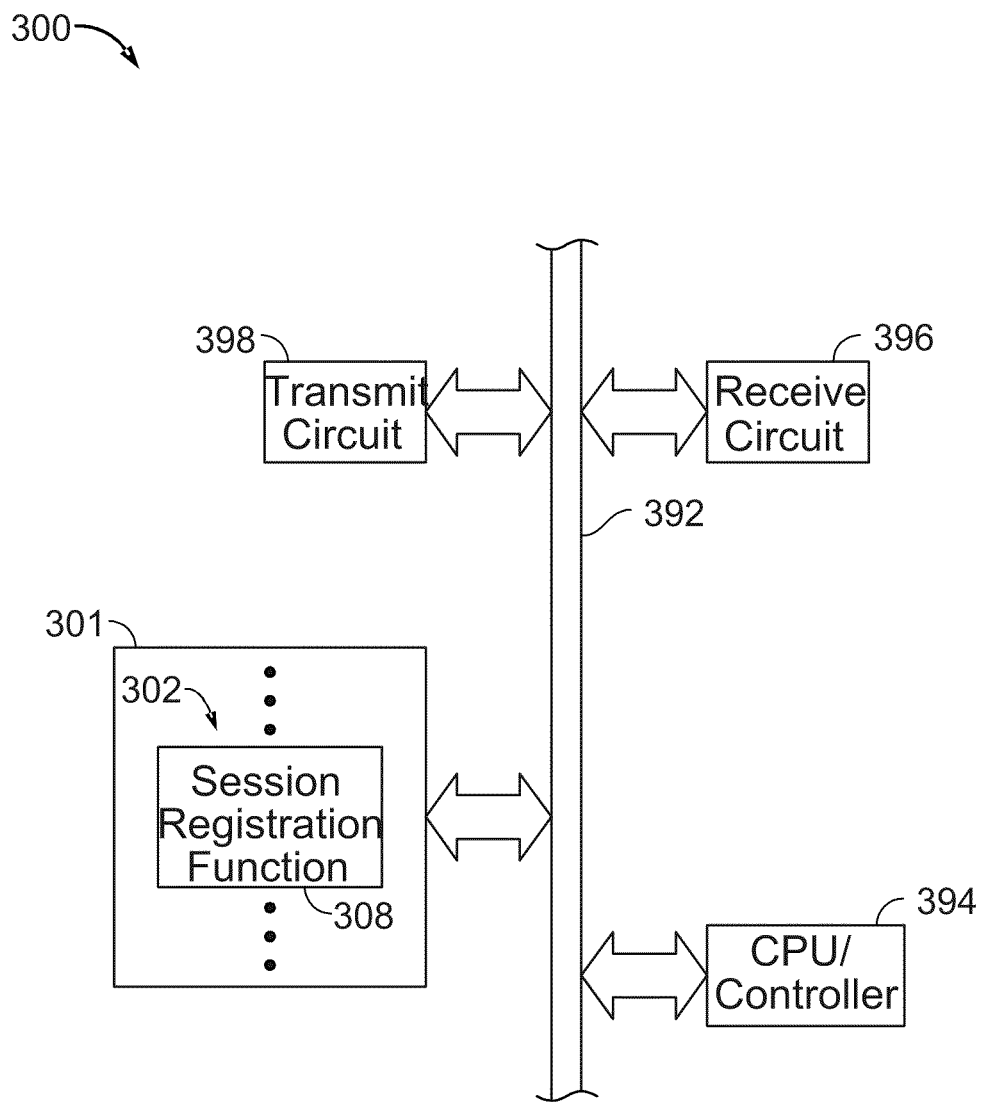
FIG. 3 is a functional block diagram of an exemplary apparatus which may be used in the communication system, shown in FIG. 2.

FIG. 3 is a functional block diagram of an exemplary apparatus 300 which may be used in the communication system, shown in FIG. 2. The apparatus 300 may comprise, a UE such as the UE 104, or any of the infrastructure entities, such as the application server, the P-CSCF 240, the HSS 238, the I-CSCF 242 and/or the S-CSCF 244. The apparatus 300 may be built and incorporated in various forms, such as a wireless communication device, or a server.

In this embodiment, the apparatus 300 comprises a Session Registration Function 308, which resides in a memory unit 301. In one embodiment, the Session Registration Function 308 may obtain registration information (e.g. private user identities, public user identities, instance IDs, and registration IDs) used in a prior registration and may generate and/or obtain new registration information (e.g., Private ID2 shown in FIG. 5, or Instance ID/Registration ID2 shown in FIG. 8). The Session Registration Function may use the registration processes shown in FIGS. 6 and 9. In another embodiment, the Session Registration Function 308 may obtain registration information (e.g., Private ID2 shown in FIG. 5, or Instance ID/Registration ID2 shown in FIG. 8) and may determine whether the registration is based on old registration information used in a previous registration (e.g., Private ID1 shown in FIG. 5). The Session Registration Function may use the registration processes shown in FIGS. 7 and 10.

The apparatus 300 further comprises a Central Processing Unit (CPU)/controller 394, a receive circuit 396, and a transmit circuit 398, which are all linked via a central data bus 392. The memory unit 301 may comprise a set of modules and/or instructions generally signified by the reference numeral 302. In one embodiment, the Session Control Function 308 resides within memory unit 301. In another embodiment (not shown in FIG. 3), the Session Control Function 308 may comprise a circuit, which may be connected to central data bus 392. In another embodiment, the Session Control Function 308 may be a combination of both software (e.g., software instructions) residing within memory unit 301, hardware (e.g., a circuit).

The memory unit 301 may comprise a set of modules and/or instructions generally signified by the reference numeral 302. In this embodiment, the modules/instructions may comprise, among other things, the Session Registration Function 308. The Session Registration Function 308 may comprise computer instructions or code for executing the process steps as shown and described in FIGS. 2, 4, 6, 7, 9, and 10. Specific instructions particular to an entity may be selectively implemented in the Session Registration Function 308. In one embodiment, the apparatus 300 may be part of a UE, such as UE 104 shown in FIG. 2. Instructions particular to the aspects of the functions as shown and described in FIGS. 2, 4, 6, and 9 may be coded in the Session Registration Function 308. In another embodiment, the apparatus 300 may be part of an infrastructure communication entity (e.g., the S-CSCF in the CN 236 shown in FIG. 2). Instructions particular to the aspects of the functions as shown and described in FIGS. 2, 4, 7, and 10 may be coded in the Session Registration Function 308.

In one embodiment, the apparatus 300 is part of a wireless device and the receive and transmit circuits 396 and 398 may be connected to a RF (Radio Frequency) circuit (not shown in FIG. 3). The receive circuit 396 may process and may buffer received signals and/or data before sending them out to the data bus 392. The data bus 392 may be used to transfer data between the transmit circuit 398, the receive circuit 396, the memory unit 301, and the CPU/controller 394. On the other hand, the transmit circuit 398 may process and may buffer the data from the data bus 392 before sending the data out of the device 300. The CPU/controller 394 may perform the function of data management of the data bus 392 and may further the function of general data processing, including executing the instructional contents of the memory unit 301.

In this embodiment, the memory unit 301 is a RAM (Random Access Memory) circuit. The exemplary function, such as the session registration function 308, may be software routines, modules and/or data sets. The memory unit 301 may be tied to another memory circuit (not shown) which may either be of the volatile or nonvolatile type. As an alternative, the memory unit 301 may comprise other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk (e.g., a floppy disc), an optical disk (e.g., a CD-ROM or a DVD-ROM), a memory card, flash memory and others well known in the art.

The CPU/controller 394 may comprise any general purpose single or multi-chip microprocessor such as an ARM, Pentium®, Pentium II®, Pentium III®, Pentium IV®, Pentium® Pro, an 8051, a MIPS®, a Power PC®, an ALPHA®, an application specific integrated circuit (ASIC), or any special purpose microprocessor such as a digital signal processor, microcontroller, or a programmable gate array.

The transmit and receive circuits 398 and 396 may comprise at least one of a wired network card, a wireless network card, an antenna and some other means for communicating with a network. The transmit and receive circuits 398 and 396 may be connected to a local area network (LAN), or a wide area network (e.g., internet) or some other form of network. The transmit and receive circuits 398 and 396 may receive signals according to wired technologies including but not limited to Ethernet, telephone (e.g., POTS), and fiber optic systems, and/or wireless technologies including but not limited a code division multiple access (CDMA or CDMA2000) communication system, a time division multiple access (TDMA) system such as GSM/GPRS (General Packet Radio Service)/EDGE (enhanced data GSM environment), IEEE 802.11 systems, and OFDM systems. The transmit and receive circuits 398 and 396 may be used to transmit and/or receive a variety of types of data including, but not limited to, voice, video, and multimedia data.

Figure 4:
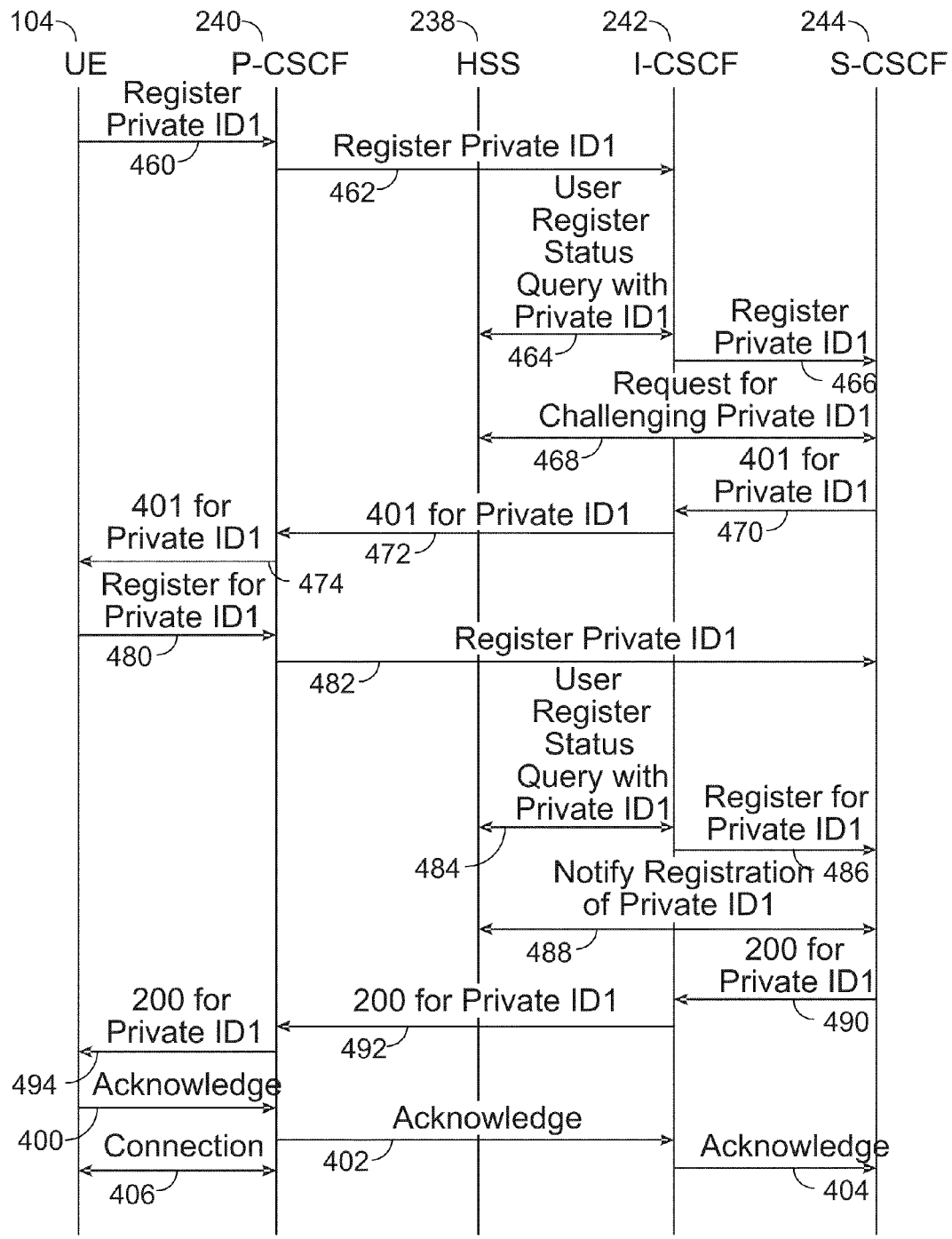
FIG. 4 shows a call flow diagram illustrating various exemplary communication messages exchanged among the various entities of FIG. 2.

FIG. 4 shows a call flow diagram illustrating various exemplary communication messages exchanged among the various entities of FIG. 2. The following five entities shown in FIG. 2, going from left to right, are shown in the top of FIG. 4: the UE 114, the P-CSCF 240, the HSS 238, the I-CSCF 242, and the C-CSCF 244. Various message flow paths (e.g., message sent from one entity to another) such as message flow path 460, are shown as lines between the entities. The vertical dimension of FIG. 4 represents the passage of time going from the top of FIG. 4 (earlier point in time) to the bottom of FIG. 4 (later point in time). The various message flow paths process from the top of FIG. 4 to the bottom of FIG. 4. Reference shall be made to elements of FIG. 2 in the description of FIG. 4.

As discussed in conjunction with FIG. 2, the UE 104, representing a subscriber of the HN 212, may travel to the VN 214 seeking access of the backbone network 230 via the VN 214 (see FIG. 2). The UE 104 starts such an access as by forming the communication session 252 with the AN 114. The UE 104 may then attempt to register (e.g., provide registration information) with the S-CSCF 244 of the CN 236 via the AN 114. In one embodiment, the UE 104 may provide a Session Initiation Protocol-Uniform Resource Identifier (SIP-URI) and a private user identity (Private ID1). In another embodiment, the UE 104 may provide a public user identity. Both the SIP-URI and Private ID1 may be unique for the UE 104.

In one embodiment, the public user identity may comprise a SIP-URI (e.g., sip:first.last@operator.com). In another embodiment, the public user identity may comprise a TEL-URI. The TEL-URI may comprise a phone number in international format (e.g., +1-234-567-8900). In yet another embodiment, the public user identity may be used to route IMS messages between the entities shown in FIG. 4 (e.g., as described below in conjunction with message flow path 464 of FIG. 4).

In one embodiment, the private user identity may comprise a network access identifier (NAI). The NAI may comprise a user name followed by a fully qualified domain name (FQDN), e.g., username@domain.com. In another embodiment, the private user identity may not be used to route IMS messages. Instead, the private user identity may be used for identification and authentication purposes. For example, the private user identity may be used to determine whether the UE 104 has access to a particular IMS service.

The UE 104 begins the registration process by sending a REGISTER request using Private ID1 as illustrated by message flow path 460. The REGISTER request is then relayed from the P-CSCF 240 in the VN 214 to the I-CSCF 242 in the HN 212, as illustrated by the message flow path 462 and as shown in FIG. 2. The I-CSCF 242 may determine which S-CSCF (e.g., S-CSCF 244) to forward the registration information to by performing a User Register Status Query using Private ID1, with HSS 238, as illustrated by the message flow path 464. Once the I-CSCF determines that it should send the registration information to S-CSCF 244, the I-CSCF 242 sends a REGISTER request to the S-CSCF 244, as indicated by the message flow path 466. Once the RESISTER request is received by the S-CSCF, the S-CSCF 244 queries HSS 238 to retrieve the relevant information for authorization and authentication, as indicated by the Challenge request illustrated in message flow path 468. If the UE 104 is a subscriber of the HN 212, the Private ID1 of the UE 104 may match a stored record in the HSS 238.

The S-CSCF 244 may then authenticate the REGISTER request by selecting an authentication vector and sending a "401 Unauthorized" response to the I-CSCF 242, as illustrated by the message flow path 470. In one embodiment, the "401 Unauthorized" response may also comprise the authentication vector. The authentication vector may comprise an authentication key, a random value, and an expected result. The S-CSCF 244 may remove the authentication key prior to sending the authentication vector to the I-CSCF 242. The "401 Unauthorized" response may indicate that extra information is required for the registration. The I-CSCF 242 sends the "401 Unauthorized" response to the P-CSCF 240. In one embodiment, the P-CSCF 240 may remove the expected result from the authentication vector. The P-CSCF 240 then forwards the "401 Unauthorized" response to the UE 104, as illustrated by the message paths 472 and 474, respectively. The UE 104 computes the authentication challenge and re-attempts to register with the S-CSCF 244 by sending a second REGISTER request providing Private ID1 and the authentication information requested by the S-CSCF 244. In one embodiment, the UE 104 may compute the authentication challenge by using the random value provided in the authentication vector and a second authentication key to generate a second expected value. The second authentication key used by the UE 104 may match the authentication key removed by the S-CSCF 244, as discussed above. The second expected value generated by the UE 104 will match the expect value removed by the P-CSCF 240, as discussed above. In one embodiment the second register request may also comprise the expected result generated by the UE 104. The second REGISTER request is sent from the UE 104 to the P-CSCF 240 as illustrated by message flow path 480, which forwards the second REGISTER request to the S-CSCF 244 as illustrated by message flow path 482. The I-CSCF 242 then queries HSS 238 to determine which S-CSCF to send the second REGISTER request to as illustrated by message flow path 484. The I-CSCF 242 may also verify the authentication information along with the Private ID1 provided by the UE 104 in the second REGISTER request. The I-CSCF 242 then sends the second REGISTER request to S-CSCF 244 as illustrated by message flow path 486.

The S-CSCF 244 responds to the second REGISTRATION request from the UE 104 by informing the notifying the HSS 238 that UE 104 is registering using Private ID1 by sending a "Notify Registration of Private ID" message to the HSS 238 as illustrated by message flow path 488. The S-CSCF 244 then sends a "200 OK" response to the I-CSCF 242 (indicated by message flow path 490). The "200 OK" response may indicate to the UE 104 that the registration is accepted or is successful. The I-CSC 242 forwards the "200 OK" response to the P-CSCF 240 as illustrated by message flow path 492. The P-CSCF 240 then forwards the "200 OK" response to the UE 104 as illustrated by message flow path 494.

The UE 104 acknowledges the registration to the S-CSCF 244, by sending an "Acknowledge" response to the S-CSCF 244. The UE 104 first transmits the "Acknowledge" response to the P-CSCF 240 as illustrated by message flow path 400. The P-CSCF 240 then forwards the "Acknowledge" response to the I-CSCF 242, and the I-CSCF 242 forwards the "Acknowledge" response to the S-CSCF 244 as illustrated by message flow paths 402 and 404 respectively. The UE 104 then establishes a signaling Connection 496 with the P-CSCF 240 as illustrated by the message flow path 406. The communication session 252 shown in FIG. 2 may use Connection 406. After the above-referenced steps, the UE 104 may be able to access application servers which may be coupled to the backbone network 230, in order to access services and/or applications.

In one embodiment, if there is a prolonged period of time that the UE 104 remains idle, e.g., the Connection 406 is not used for a long period of time, the connection 406 and the session 252 may be torn down (e.g., disconnected). To reconnect the session 252 (as shown FIG. 2), the UE 104 may need to go through the registration process again (e.g., repeat the process steps as shown by message paths described above and shown in FIG. 4). The UE 104 may use the same private user identity (e.g., Private ID1) that it used in the prior registration. Since the same private user identity is used, the S-CSCF 244 may determine that the UE 104 wishes to perform a registration that replaces the currently existing IMS registration, possibly with a different IP address. It should be noted that in FIG. 2, the session represented by the reference numeral 252 is shown between the UE 104 and the AN 114 for illustrative purposes. The actual logical session is between the UE 104 and the S-CSCF 244.

Figure 5:
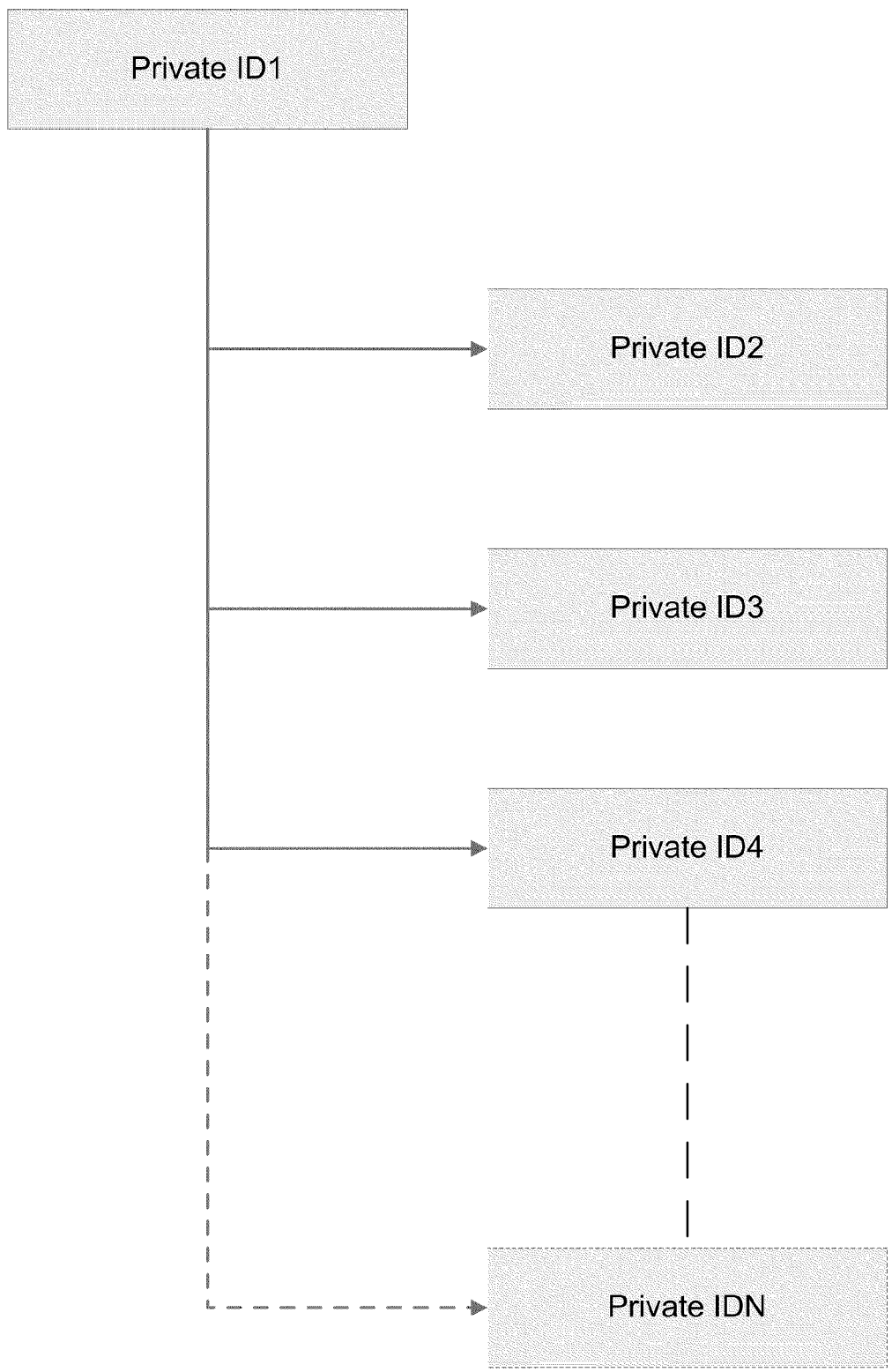
FIG. 5 illustrates exemplary private IDs which may be used by the communication system shown in FIG. 2.

FIG. 5 illustrates exemplary private IDs which may be used by the communication system 200 shown in FIG. 2. References will be made to elements in FIG. 2 and FIG. 4 in the description for FIG. 5. The exemplary private IDs shown in FIG. 5 may be used by the UE 104 to perform multiple registrations, including new registrations, replacement registrations and additional registrations. The Private ID1 may be used by the UE 104 to perform a new registration or a replacement registration, as described below. The Private ID2, Private ID3, Private ID4 through Private IDN may be used by the UE 104 to perform additional registrations, as described below. The Private ID1 may be used by the UE 104 to perform an IMS registration to establish the connection 406, as described in FIG. 4. The Private ID2 through Private IDN may be derived from (e.g., based on, at least in part) the Private ID1. The private user identities Private ID2 through Private IDN may be used to indicate to the network that the UE 104 is initiating an additional registration. For example, if the UE 104 previously used the Private ID1 to register, and then sends the Private ID2 in another registration, then an additional registration is created. A private user identity, such as the Private ID1, may comprise two portions, a user portion and a fully qualified domain name (FQDN).

In one embodiment, subsequent private user identities such as Private ID2 through Private IDN may be created by modifying the user portion of the Private ID1 and using the same FQDN from the Private ID1. In another embodiment, additional information may be appended, pre-pended or inserted into the user portion. For example, the Private ID1 may comprise the following: "username@domain.com." Using Private ID1, the Session Registration Function 308 of the UE 104 may create the Private ID2 as follows: "username-001@domain.com."

In one embodiment, subsequent private user identities such as Private ID2 through Private IDN may be created by modifying the FQDN of the Private ID1 and using the same user portion from the Private ID1. In another embodiment, an additional label may be added to the FQDN to create subsequent private user identities such as Private ID2 through Private IDN. For example, the Private ID1 may comprise the following: "username@domain.com." Using the Private ID1, the Session Registration Function 308 of the UE 104 may create the Private ID2 as follows: "username@domain.001.com."

In one embodiment, the HSS 238 may use the Private ID1 through Private IDN to determine whether the registration request from the UE 104 is for a new registration. For example, if UE 104 registers with HSS 238 using the Private ID1, HSS 238 may determine whether the Private ID1 was used in a previous registration. If the Private ID1 was not used in a previous registration, then HSS 238 will create a new registration for UE 104 using the Private ID1. In another embodiment, Private ID1 through Private IDN may be used by the HSS 238 to determine whether the registration request from the UE 104 is for a replacement registration. For example, if the UE 104 registers with HSS 238 using Private ID1, HSS 238 may determine whether Private ID1 was used in a previous successful registration. If Private ID1 was used in a previous registration and the previous registration has not expired (e.g., timed out due to inactivity), then HSS 238 and/or the S-CSCF 244 may deregister the previous registration and may create a replacement registration for the UE 104 using Private ID1. In still another embodiment, Private ID1 through Private IDN may be used by the HSS 238 to determine whether the registration request from the UE 104 is for an additional registration. For example, if the UE 104 previously registered using Private ID1, and later performs a new registration using Private ID2, then HSS 238 may determine that Private ID2 is based on (e.g., derived from) Private ID1, and may create an additional registration for the UE 104.

In one embodiment, the UE 104 may perform an additional IMS registration because the UE 104 establishes a second session using the AN 234, instead of the AN 114 while still retaining the original session 252 with the AN 114. The AN 114 may use a different wireless communication protocol than the AN 234. For example, the AN 234 may be a WiFi transceiver (e.g., 802.11g) and the AN 114 may be a WCDMA NodeB. The AN 114 and the AN 234 may also use the same wireless communication protocol. For example, the AN 114 and the AN 234 may both be WCDMA NodeBs. In one embodiment, the UE 104 may establish the second session due to a second service or application in use on the UE 104. For example, the UE 104 may be running a streaming music service and may already be registered with the HSS 238. The UE 104 may then run a news feed service, which may establish a second session and thus perform a second (e.g., additional) registration.

In one embodiment, the UE 104 may use a different private user identity such as Private ID2 in the message path 460 shown in FIG. 4. In another embodiment, the HSS 238 gets the new private user identity (e.g., Private ID2) and analyzes it. If the HSS 238 determines that this private user identity (e.g., Private ID2) is not present in the HSS 238 and it is derived from another private user identity (e.g., Private ID1) that may be stored in the HSS 238, then the HSS 238 may then allow the S-CSCF to proceed with registration and create an additional registration for the UE 104.

In one embodiment, the registration process using the Private ID2 may be a reduced version of the registration process shown in FIG. 4. For example, when the UE 104 performs an additional registration using the Private ID2, the registration process may not use the message call flows 460, 462, 464, 466, 468, 470, 472, and 474, as shown in FIG. 4. The registration process may only use message call flows 480, 482, 484, 486, 488, 490, 492, 494, 400, 402, 404, and 406. In another embodiment, any one of the message call flows shown in FIG. 4 may not be used when the UE 104 performs an additional registration using any one of the Private ID2 through Private IDN.

In one embodiment, the HSS 238 may include both the private user identity received from the S-CSCF 244 (e.g., Private ID1) and the private user identity (e.g., Private ID2) which is derived from the Private ID1 in the response message that it sends back to S-CSCF 244, as presented by the message path 468 in FIG. 4. The S-CSCF 244 may then determine whether the Private ID2 is based on the Private ID1. If the Private ID2 is based on the Private ID1, the S-CSCF 244 may then create an additional registration for the UE 104.

In another embodiment, the HSS 238 informs the S-CSCF 244 about the new private user identity (e.g., Private ID2) and may additionally send a list of all private identities (e.g., Private ID3 through Private IDN) currently registered by the UE 104.

In yet another embodiment for the HSS 238 provides the new private user identity (e.g., Private ID2) to the S-CSCF 244. The S-CSCF 244 may analyze the Private ID2 and may determine that the Private ID2 is based on private user identity (e.g., Private ID1). The HSS 238 may then allow the S-CSCF to proceed with registration and create an additional registration for the UE 104.

Figure 6:
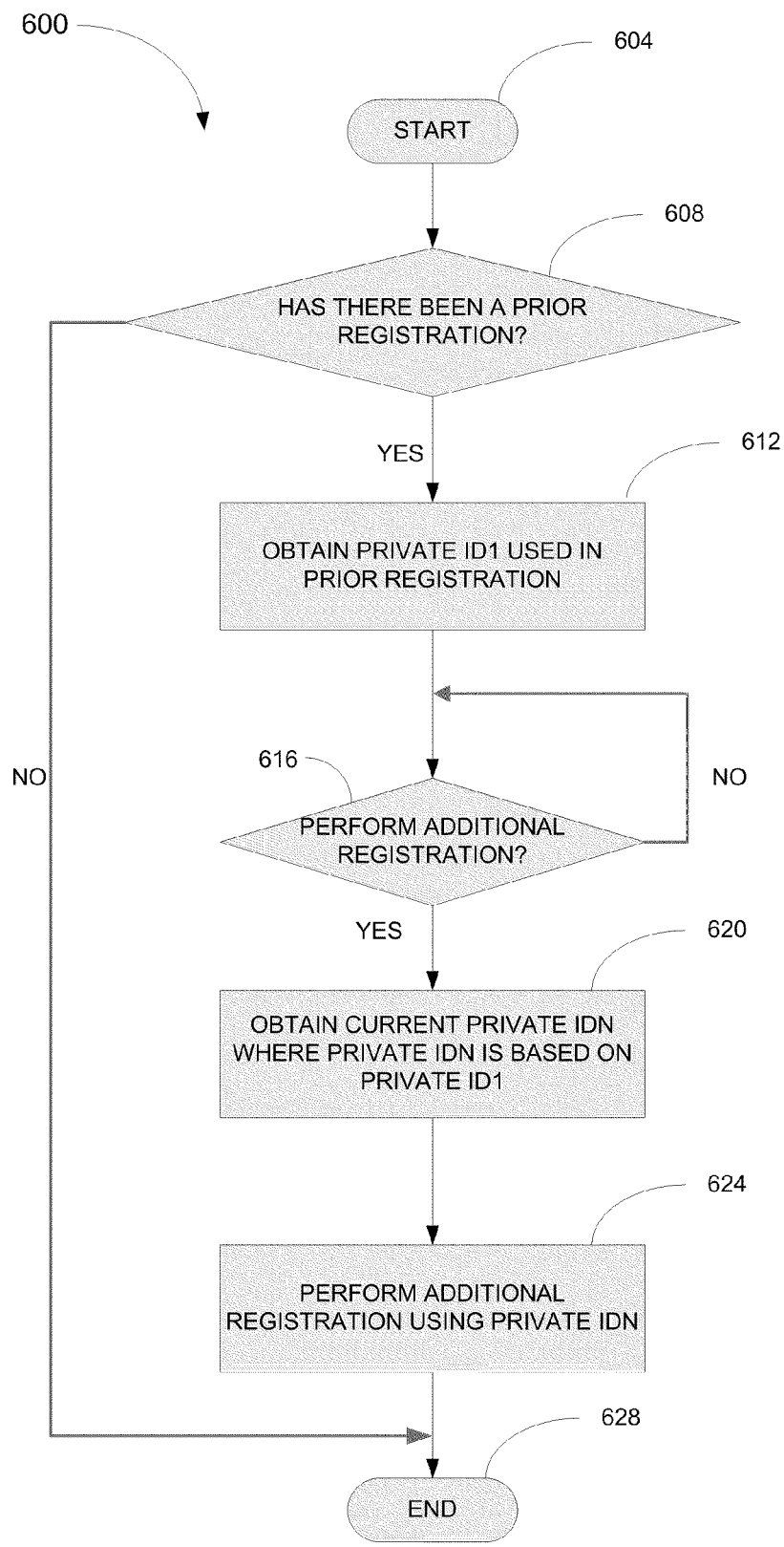
FIG. 6 is a flow chart illustrating a first exemplary registration process.

FIG. 6 is a flow chart illustrating a first exemplary registration process 600. The process 600 may be performed by UE 104 to perform an additional registration with components of the CN 236 (e.g., the HSS 238 and/or the S-CSCF 244). In one embodiment, the process 600 may be performed using any combination of the CPU/controller 394, the receive circuit 396, the transmit circuit 398, the memory unit 301, the set of modules and/or instructions 302, and the Session Registration Function 308. In another embodiment, the Session Registration Function 308 may be software (e.g., software instructions), hardware (e.g., a circuit), or a combination of both.

The process begins at start block 604 and moves to block 608. At block 608, the UE 104 determines whether a prior registration exists for the UE 104. If no prior registration exists, the process 600 moves to end block 628. If a prior registration exists, the process 600 moves to block 612. At block 612, the UE 104 obtains the private user identity which was used in the prior registration (e.g., Private ID1). In another embodiment, the UE 104 may obtain any private user identity (e.g., Private ID4) used by the UE 104 in a prior registration. After obtaining the private user identity used in the prior registration, the process 600 moves to block 616, where the UE 104 determines whether to perform an additional registration. If the UE 104 determines that no additional registration is needed, the process 600 loops back to block 616. If the UE 104 determines that an additional registration is needed, the process 600 moves to block 620, where the UE 104 obtains a current user identity (e.g., Private IDN) based on the private use identity obtained at block 612 (e.g., Private ID1). The Private IDN may be derived from the Private ID1 as discussed above. In one embodiment, the UE 104 may generate Private IDN using Session Registration Function 308. In another embodiment, the UE 104 may provide Private ID1 to another device such as a server, and the device may generate Private IDN, and provide Private IDN to the UE 104. After obtaining Private ID2, the process 600 then moves to block 624, where the UE 104 will perform an additional registration using Private IDN. As discussed above in conjunction with FIG. 5, the additional registration may comprise fewer steps when compared to the normal registration process shown in FIG. 4. After performing the additional registration, the process 600 moves to end block 628, where the process 600 ends.

Figure 7:
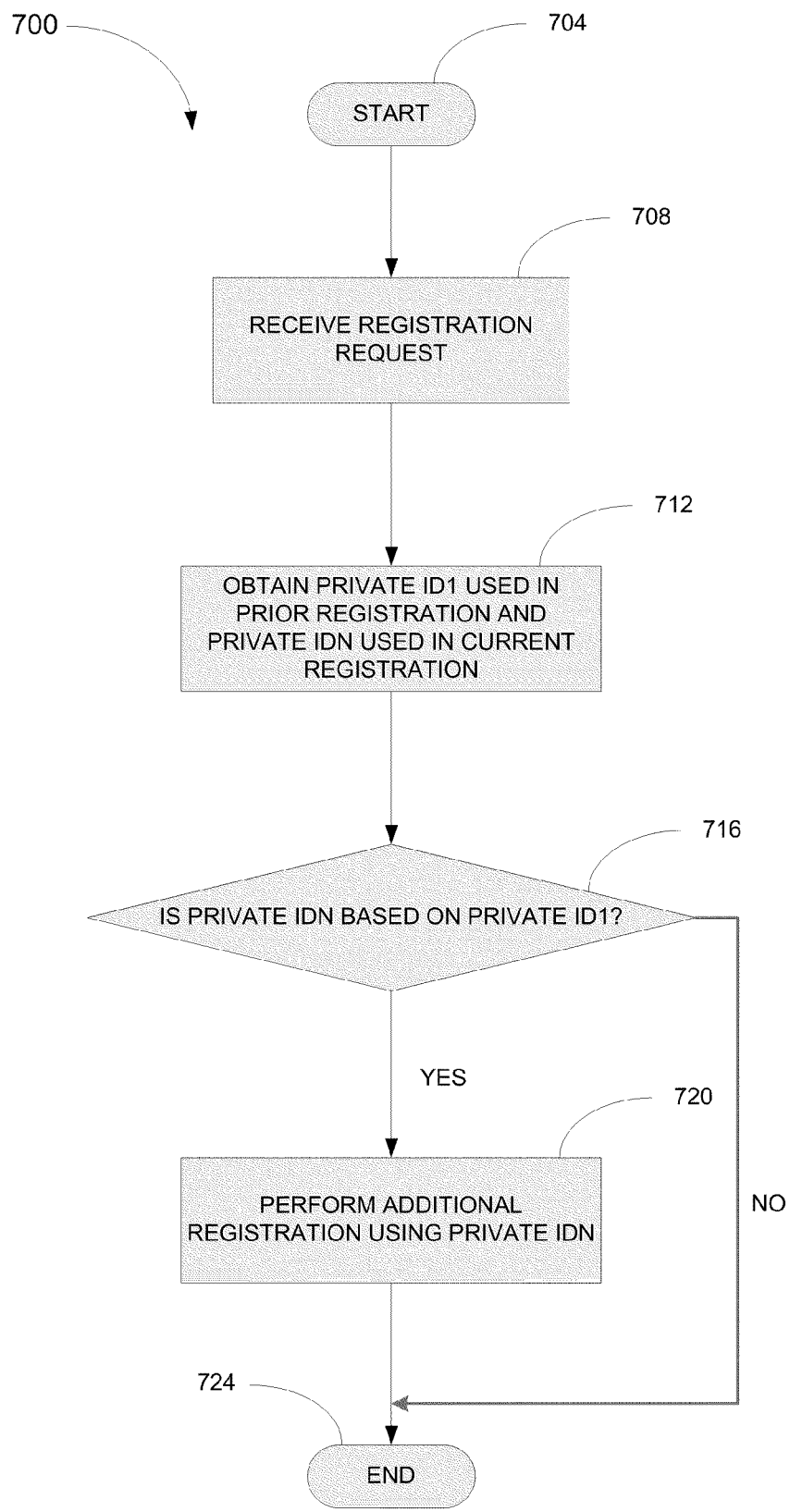
FIG. 7 is a flow chart illustrating a second exemplary registration process.

FIG. 7 is a flow chart illustrating a second exemplary registration process 700. The process 700 may be performed by any combination of the HSS 238, the S-CSCF 244, the HSS 238, the P-CSCF 240, and an application server, to verify registration information sent by the UE 104. In one embodiment, the process 700 may be performed using any combination of the CPU/controller 394, the receive circuit 396, the transmit circuit 398, the memory unit 301, the set of modules and/or instructions 302, and the Session Registration Function 308. In another embodiment, the Session Registration Function 308 may be software (e.g., software instructions), hardware (e.g., a circuit), or a combination of both. For the purposes of describing one embodiment encompassed by FIG. 7, the HSS 238 is referred to as carrying out the steps of the process. It is understood that any combination of the HSS 238, the S-CSCF 244, the HSS 238, the P-CSCF 240, and an application server could perform the steps described below.

The process 700 begins at start block 704 and moves to block 708. At block 708, a registration request is received from the UE 104. After receiving the registration request, the process 700 moves to block 712. At block 712, the HSS 238 obtains the private user identity (e.g., Private IDN) that is used in the current registration request. The process 700 then moves to block 716, where the HSS 238 determines whether the current private user identity (e.g., Private IDN) is based on another private user identity (e.g., Private ID1) used by the UE 104 in a prior registration. In another embodiment, the current private user identity (e.g., Private IDN) may be based on any private user identity used by the UE 104 in a prior registration (e.g., Private ID5). If the current private user identity (e.g., Private ID2) is not based on another private user identity (e.g., Private ID1), then the process moves to end block 724. If the current private user identity (e.g., Private ID2) is based on another private user identity (e.g., Private ID1), then HSS 238 will allow the UE 104 to perform an additional registration. After allowing the additional registration, the process 700 moves to end block 724.

FIG. 8 illustrates exemplary instance and registration IDs which may be used by the communication system 200 shown in FIG. 2. The exemplary instance and registration IDs shown in FIG. 8 may be used by the UE 104 to perform multiple registrations, including new registrations, replacement registrations and additional registrations. The Instance ID/Registration ID1 may be used by the UE 104 to perform a new registration or a replacement registration, as described below. The Instance ID/Registration ID2, Instance ID/Registration ID3, Instance ID/Registration ID4 through Instance ID/Registration IDN may be used by the UE 104 to perform additional registrations, as described below. In one embodiment, the UE 104 may generate its own Instance ID/Registration ID1 through Instance ID/Registration IDN. In another embodiment, the UE 104 may be provided at least one of the Instance ID/Registration ID1 through Instance ID/Registration IDN by another device, such as a server.

In one embodiment, the UE 104 may have a unique Instance ID. For example, the Instance ID may be generated using a variety of factors, including but not limited to the current time/date, a medium access control (MAC) address, an International Mobile Subscriber Identity (IMSI), and an international mobile equipment identity (IMEI). In another example, the Instance ID may be generated using a random number generator. A variety of methods, functions, and factors may be used in generating and/or determining the Instance ID for the UE 104.

In one embodiment, the Registration ID1 through Registration IDN may comprise sequential numbers. For example, the Registration ID1 may be "001", the Registration ID2 may be "002", and the Registration ID3 may be "003" and so on and so forth. In another embodiment, the Registration ID1 through Registration IDN may comprise different labels, such that each of the Registration ID1 through Registration IDN is different. For example, the Registration ID1 may be "AAA" and the Registration ID2 may be "BBB." In other embodiments, the Registration ID1 through Registration IDN may comprise any string, label, integer, numeric value and/or name.

In one embodiment, the registration process using the Instance ID/Registration ID2 may be a reduced version of the registration process shown in FIG. 4. For example, when the UE 104 performs an additional registration using the Instance ID/Registration ID2, the registration process may not use the message call flows 460, 462, 464, 466, 468, 470, 472, and 474, as shown in FIG. 4. The registration process may only use message call flows 480, 482, 484, 486, 488, 490, 492, 494, 400, 402, 404, and 406. In another embodiment, any one of the message call flows shown in FIG. 4 may not be used when the UE 104 performs an additional registration using any one of the Instance ID/Registration ID2 through Private Instance ID/Registration IDN.

The Instance ID combined with a registration ID may be used by the UE 104 to perform a new registration with the HSS 238. For example, UE 104 may initially register with the HSS 238 using the combination of the Instance ID and the registration ID1. The initial registration of UE 104 may follow the same call flow diagram illustrated in FIG. 4, except that instead of using the Private ID1, the Instance ID/Registration ID1 combination is used. When performing an additional registration, the UE 104 may use the same Instance ID, but use a different registration ID. For example, if the UE 104 previously registered using Instance ID/Registration ID1, then it may use Instance ID/Registration ID2 when performing an additional registration. The HSS 238 may determine that UE 104 performed a previous successful registration using the same Instance ID, but is currently registering using the same Instance ID and a different registration ID (e.g., Registration ID2). The HSS 238 may then allow the UE 104 to perform an additional registration.

In another embodiment, the HSS 238 may use the Instance ID/Registration ID1 to determine whether the registration request from the UE 104 is for a replacement registration. For example, if the UE 104 may register with HSS 238 using Instance ID/Registration ID1. The HSS 238 may determine whether Instance ID/Registration ID1 was used in a previous successful registration. If Instance ID/Registration ID1 was used in a previous registration and the previous registration has not expired (e.g., timed out due to inactivity), the HSS 238 and/or the S-CSCF 244 may deregister the previous registration (e.g., remove the previous registration) and may create a replacement registration for the UE 104 using Private ID1.

In one embodiment, the UE 104 may perform multiple registrations with entities in HN 212 (e.g., S-CSCF 244, I-CSCF 242, and/or HSS 238). The UE 104 may perform an initial registration and provide a current public user identity which may be associated with an instance ID and a registration ID that was previously registered. If multiples registrations are used, the S-CSCF 244 may determine whether the previous registrations have expired. If the previous registrations have not expired, the S-CSCF 244 may perform a deregistration procedure (e.g., removing the previous registrations) for previously registered public user identities belonging to the instance ID and the registration ID, excluding the current publication user identity being registered. In one embodiment, the deregistration of previously registered public user identities and registration of the current public user identity may comprise a replacement registration, as shown in block 1026 of FIG. 10.

Figure 9:
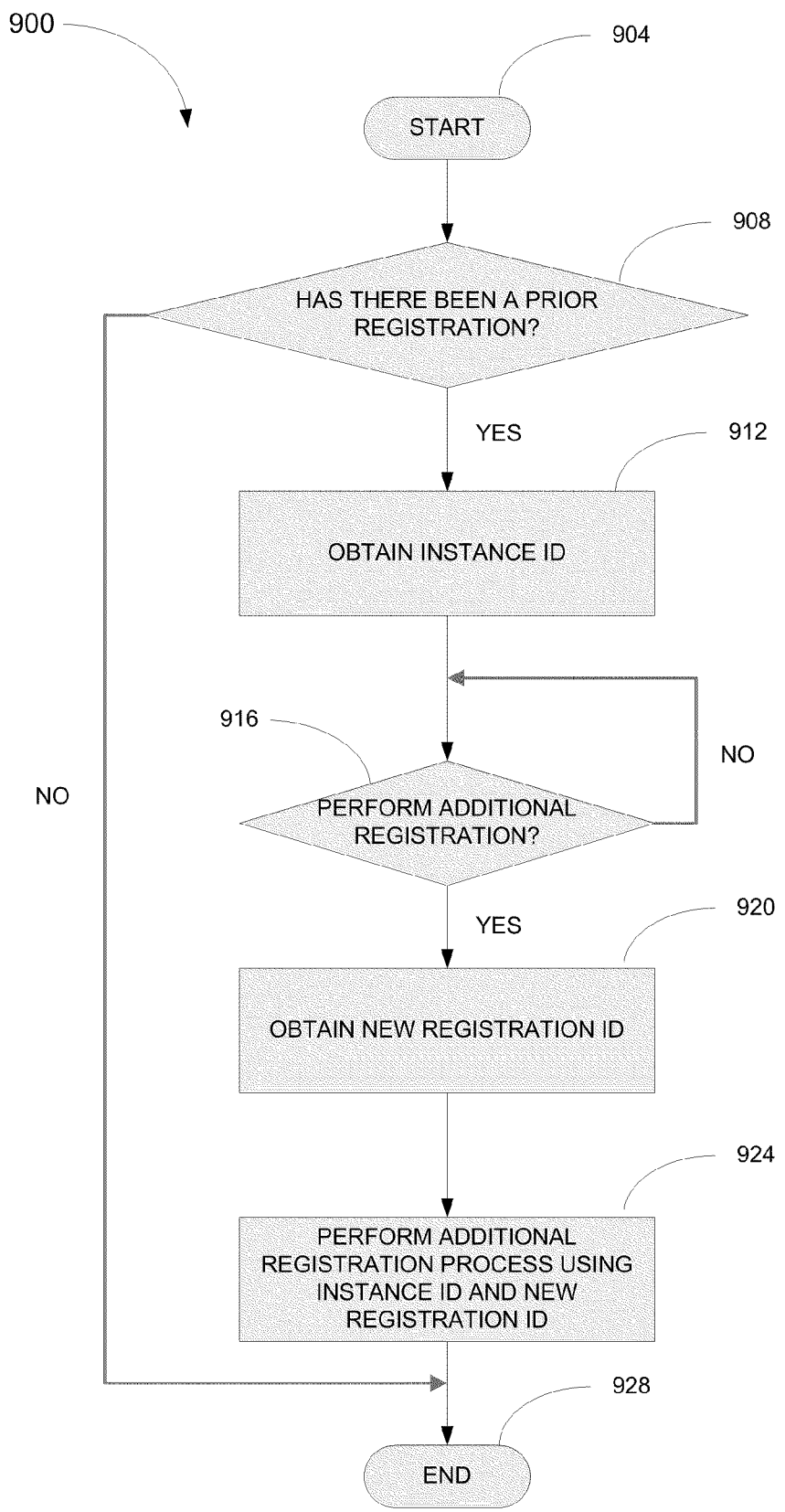
FIG. 9 is a flow chart illustrating a third exemplary registration process.

FIG. 9 is a flow chart illustrating a third exemplary registration process 900. The process 900 may be performed by the UE 104 to perform an additional registration with components of the CN 236 (e.g., the HSS 238 and/or the S-CSCF 244). In one embodiment, the process 900 may be performed using any combination of the CPU/controller 394, the receive circuit 396, the transmit circuit 398, the memory unit 301, the set of modules and/or instructions 302, and the Session Registration Function 308. In another embodiment, the Session Registration Function 308 may be software (e.g., software instructions), hardware (e.g., a circuit), or a combination of both.

The process begins at start block 904 and moves to block 908. At block 908, the UE 104 determines whether a prior registration exists for the UE 104. If no prior registration exists, the process 900 moves to end block 928. If a prior registration exists, the process 900 moves to block 912. At block 912, the UE 104 obtains the Instance ID which was used in the prior registration. After obtaining the Instance ID used in the prior registration, the process 900 moves to block 916, where the UE 104 determines whether to perform an additional registration. If the UE 104 determines that no additional registration is needed, the process 900 loops back to block 916. If the UE 104 determines that an additional registration is needed, the process 900 moves to block 920, where the UE 104 obtains a new Registration ID (e.g., Registration ID2). In one embodiment, the UE 104 may generate the Registration ID2 as discussed earlier, using Session Registration Function 308. In another embodiment, another device, such as a server, may generate the Registration ID2, and provide the Registration ID2 to the UE 104. After obtaining the Registration ID2, the process 600 then moves to block 624, where the UE 104 will perform an additional registration using the Instance ID/Registration ID2. As discussed above in conjunction with FIG. 7, the additional registration may comprise fewer steps when compared to the normal registration process shown in FIG. 4. After performing the additional registration, the process 900 moves to end block 928, where the process 900 ends.

Figure 10:
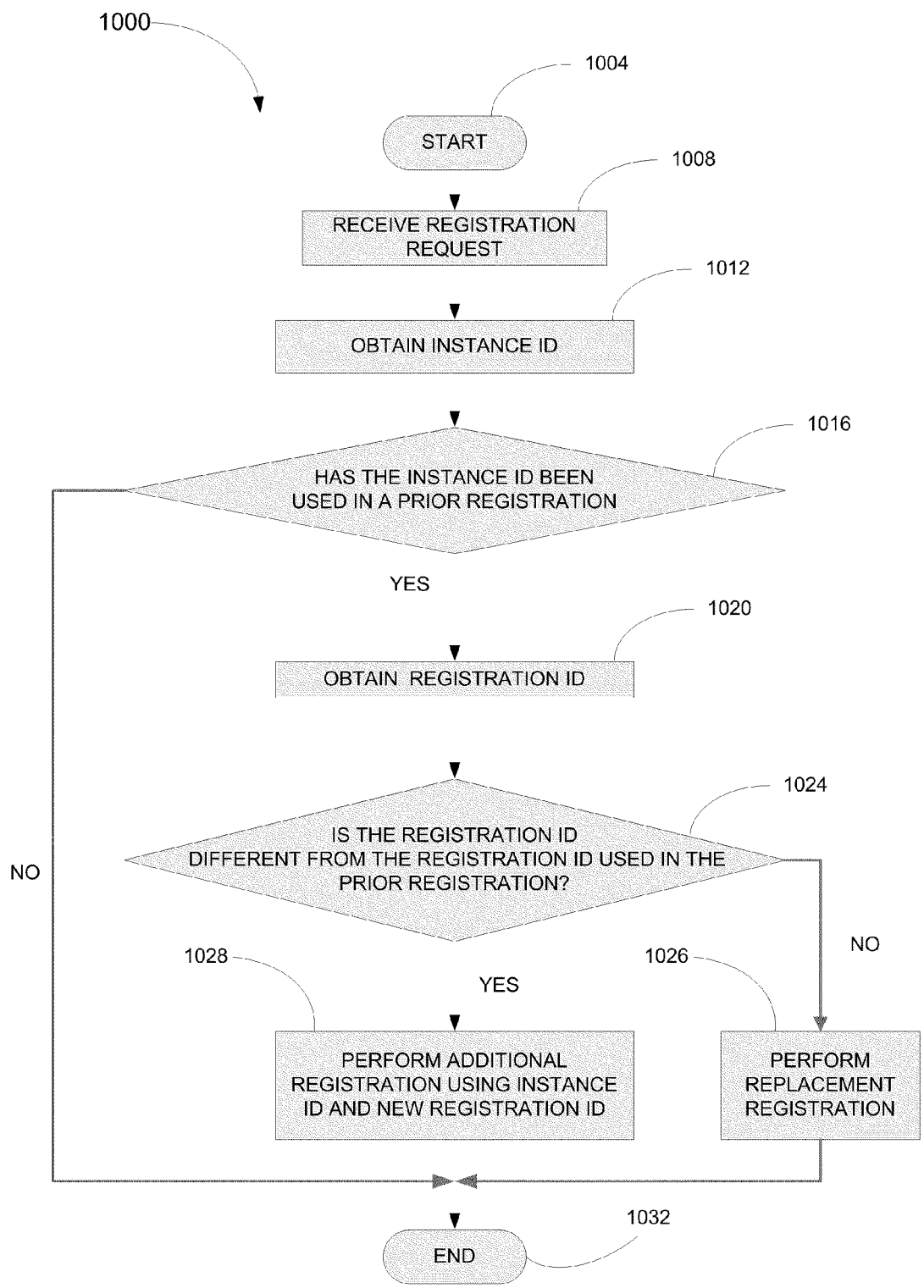
FIG. 10 is a flow chart illustrating a fourth exemplary registration process.

FIG. 10 is a flow chart illustrating a fourth exemplary registration process 1000. The process 1000 may be performed by any combination of the HSS 238, the S-CSCF 244, the HSS 238, the P-CSCF 240, and an application server, to verify registration information sent by the UE 104. In one embodiment, the process 1000 may be performed using any combination of the CPU/controller 394, the receive circuit 396, the transmit circuit 398, the memory unit 301, the set of modules and/or instructions 302, and the Session Registration Function 308. In another embodiment, the Session Registration Function 308 may be software (e.g., software instructions), hardware (e.g., a circuit), or a combination of both. For the purposes of describing one embodiment encompassed by FIG. 10, the HSS 238 is referred to as carrying out the steps of the process. It is understood that any combination of the HSS 238, the S-CSCF 244, the HSS 238, the P-CSCF 240, and an application server could perform the steps described below.

The process 1000 begins at start block 1004 and moves to block 1008. At block 1008, a registration request is received from the UE 104. After receiving the registration request, the process 1000 moves to block 1012. At block 1012, the HSS 238 obtains the Instance ID that was used in the registration request. The process 1000 then moves to block 1016, where the HSS 238 determines whether the Instance ID was used in a prior registration. If the instance ID was not used in a prior registration, the process 1000 moves to end block 1032. If the Instance ID was used in a prior registration, the process 1000 moves to block 1020. At block 1020, the HSS 238 obtains the registration ID (e.g., Registration ID2) for the current registration. After obtaining the registration ID, the process 1000 moves to block 1024, where the HSS 238 determines whether the registration ID used in the current registration is different from the registration ID used in the prior registration. If the registration ID in the current registration is the same as the registration ID in the prior registration, the process moves to block 1026, where the HSS 238 performs a replacement registration, as described above in conjunction with FIGS. 5 and 8. After performing the replacement registration, the process 1000 then moves to end block 1032. If the registration ID in the current registration is not the same as the registration ID in the prior registration, the process moves to block 1028, where the HSS 238 will allow the UE 104 to perform an additional registration. After allowing the additional registration, the process 1000 moves to end block 1032.

It should be further be noted that the inventive processes as described may also be coded as computer-readable instructions carried on any computer-readable medium known in the art. Such a medium may be of the storage type and may take the form of a volatile or non-volatile storage medium as also described previously, for example, in the description of the memory unit 301 in FIG. 6. The computer-readable medium may be part of a computer product separate from the apparatus 300. In one embodiment, the software instructions may be transmitted using a coaxial cable, a copper wire, an optical cable, and an air interface carrying acoustic, electromagnetic or optical waves capable of carrying signals readable by machines or computers.

The above-described methods may be realized in a program format to be stored on a computer readable recording medium that includes any kinds of recording devices for storing computer readable data, for example, a CD-ROM, a DVD, a magnetic tape, memory card, and a disk, and may also be realized in a carrier wave format (e.g., Internet transmission or Bluetooth transmission).

While specific blocks, sections, devices, functions and modules may have been set forth above, a skilled technologist will realize that there are many ways to partition the system, and that there are many parts, components, modules or functions that may be substituted for those listed above. In addition, the steps described in the above-referenced figures may be performed in a different order, may be performed simultaneously and certain of the steps may be omitted.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. Other than as described above, any other logical blocks, circuits, and algorithm steps described in connection with the embodiment may be implemented in hardware, software, firmware, or combinations thereof. The scope of the invention is indicated by the appended claims rather than by the foregoing description. All changes which come within the meaning and range of equivalency of the claims are to be embraced within their scope. It will be understood by those skilled in the art that theses and other changes in form and detail may be made therein without departing from the scope and spirit of the invention.

What is claimed is:

1. A wireless communication apparatus, comprising:
   circuitry configured to:
   obtain a first identifier comprising a first identification portion and a second identification portion, wherein the first identifier is used in a prior registration, and
   obtain a second identifier that is different than the first identifier comprising at least one of the first identification portion and the second identification portion, and further comprising a third identification portion, wherein the second identifier is used in an additional registration;

a receiver configured to receive at least one of voice, video, and multimedia data; and a transmitter configured to transmit the first identifier and the second identifier to a network server;

wherein the first identification portion comprises an instance identifier, the second identification portion comprises a first registration identifier, and the third identification portion comprises a second registration identifier.

2. The wireless communication apparatus of claim 1, wherein the first identifier comprises a first private user identity and the second identifier comprises a second private user identity.

3. The wireless communication apparatus of claim 1, wherein the first identification portion comprises a user name, and the second identifier portion comprises a domain name.

4. The wireless communication apparatus of claim 1, wherein the instance identifier comprises at least one of a medium access control (MAC) address, a International Mobile Subscriber Identity (IMSI), and an international mobile equipment identity (IMEI).

5. The wireless communication apparatus of claim 1, wherein the instance identifier is based on, at least in part, at least one of a date, a time, or a number generated by a random number generator.

6. The wireless communication apparatus of claim 1, wherein each of the prior registration and the additional registration comprises a record containing Internet Protocol Multimedia System (IMS) registration data.

7. The wireless communication apparatus of claim 1, wherein the second identifier comprises the first identification portion and the third identification portion, and wherein the third identification portion comprises the second identification portion and additional information.

8. The wireless communication apparatus of claim 1, wherein the second identifier comprises the second identification portion and the third identification portion, and wherein the third identification portion comprises the first identification portion and additional information.

9. The wireless communication apparatus of claim 1, wherein the network server is configured to verify that the second identifier comprises the first identification portion and the third identification portion, and wherein the third identification portion comprises the second identification portion and additional information, and the network server is further configured to perform an additional registration based on the verification.

10. The wireless communication apparatus of claim 1, wherein the network server is configured to verify that the second identifier comprises the second identification portion and the third identification portion, and wherein the third identification portion comprises the first identification portion and extra information, and the network server is further configured to perform an additional registration based on the verification.

11. The wireless communication apparatus of claim 1, wherein the circuitry is further configured to determine whether the circuitry has performed the prior registration.

12. The wireless communication apparatus of claim 1, wherein the circuitry is further configured to determine whether to perform the additional registration.

13. The wireless communication apparatus of claim 1, wherein at least one of the first identifier and the second identifier is stored in a memory that is in communication with the circuitry.

14. A wireless communication apparatus, comprising:
means for obtaining a first identifier comprising a first identification portion and a second identification portion, wherein the first identifier is used in a prior registration, and means for obtaining a second identifier that is different than the first identifier comprising at least one of the first identification portion and the second identification portion, and further comprising a third identification portion, wherein the second identifier is used in an additional registration;

means for receiving at least one of voice, video, and multimedia data; and means for transmitting the first identifier and the second identifier to a network server;

wherein the first identification portion comprises an instance identifier, the second identification portion comprises a first registration identifier, and the third identification portion comprises a second registration identifier.

15. The wireless communication apparatus of claim 14, wherein the first identifier comprises a first private user identity and the second identifier comprises a second private user identity.

16. The wireless communication apparatus of claim 14, wherein the network server is configured to verify that the second identifier comprises the first identification portion and the third identification portion, and wherein the third identification portion comprises the second identification portion and additional information, and the network server is further configured to perform an additional registration based on the verification.

17. The wireless communication apparatus of claim 14, wherein the network server is configured to verify that the second identifier comprises the second identification portion and the third identification portion, and wherein the third identification portion comprises the first identification portion and extra information, and the network server is further configured to perform an additional registration based on the verification.

18. A method for registering a wireless apparatus, the method comprising:
obtaining a first identifier comprising a first identification portion and a second identification portion, wherein the first identifier is used in a prior registration, and obtaining a second identifier that is different than the first identifier comprising at least one of the first identification portion and the second identification portion, and further comprising a third identification portion, wherein the second identifier is used in an additional registration;

transmitting the first identifier and the second identifier to a network server;

wherein the first identification portion comprises an instance identifier, the second identification portion comprises a first registration identifier, and the third identification portion comprises a second registration identifier.

19. The method of claim 18, wherein the first identifier comprises a first private user identity and the second identifier comprises a second private user identity.

20. The method of claim 18, wherein the network server is configured to verify that the second identifier comprises the first identification portion and the third identification portion, and wherein the third identification portion comprises the second identification portion and additional information, and the network server is further configured to perform an additional registration based on the verification.

21. The method of claim 18, wherein the network server is configured to verify that the second identifier comprises the second identification portion and the third identification portion, and wherein the third identification portion comprises the first identification portion and extra information, and the network server is further configured to perform an additional registration based on the verification.

22. A computer program product, comprising:
  non-transitory computer-readable medium comprising:
    code for causing a computer to obtain a first identifier comprising a first identification portion and a second identification portion, wherein the first identifier is used in a prior registration, and
    code for causing a computer to obtain a second identifier that is different than the first identifier comprising at least one of the first identification portion and the second identification portion, and further comprising a third identification portion, wherein the second identifier is used in an additional registration; and
    code for causing a computer to transmit the first identifier and the second identifier to a network server;
  wherein the first identification portion comprises an instance identifier, the second identification portion comprises a first registration identifier, and the third identification portion comprises a second registration identifier.

23. The computer program product of claim 22, wherein the first identifier comprises a first private user identity and the second identifier comprises a second private user identity.

24. The computer program product of claim 22, wherein the network server is configured to verify that the second identifier comprises the first identification portion and the third identification portion, and wherein the third identification portion comprises the second identification portion and additional information, and the network server is further configured to perform an additional registration based on the verification.

25. The computer program product of claim 22, wherein the network server is configured to verify that the second identifier comprises the second identification portion and the third identification portion, and wherein the third identification portion comprises the first identification portion and extra information, and the network server is further configured to perform an additional registration based on the verification.

26. A communication apparatus, comprising:
  a circuitry configured to:
    receive a first identifier comprising a first identification portion and a second identification portion, wherein the first identifier is used in a prior registration,
    receive a second identifier that is different than the first identifier comprising a third identification portion and a fourth identification portion, wherein the second identifier is used in an additional registration, and
    verify that the third identification portion comprises at least one of the first identification portion and the second identification portion; and
  a transmitter configured to transmit data indicative of verification;
  wherein the first identification portion comprises an instance identifier, the second identification portion comprises a first registration identifier, and the third identification portion comprises a second registration identifier.

27. The communication apparatus of claim 26, wherein the first identifier comprises a first private user identity and the second identifier comprises a second private user identity.

28. The communication apparatus of claim 26, wherein the first identification portion comprises a user name, and the second identifier portion comprises a domain name.

29. The communication apparatus of claim 26, wherein the instance identifier comprises at least one of a medium access control (MAC) address, a International Mobile Subscriber Identity (IMSI), and an international mobile equipment identity (IMEI).

30. The communication apparatus of claim 26, wherein the instance identifier is based on, at least in part, at least one of a date, a time, or a number generated by a random number generator.

31. The communication apparatus of claim 26, wherein each of the prior registration and the additional registration comprises a record containing Internet Protocol Multimedia System (IMS) registration data.

32. The communication apparatus of claim 26, wherein the second identifier comprises the first identification portion and the third identification portion, and wherein the third identification portion comprises the second identification portion and additional information.

33. The communication apparatus of claim 26, wherein the second identifier comprises the second identification portion and the third identification portion, and wherein the third identification portion comprises the first identification portion and additional information.

34. The communication apparatus of claim 26, wherein the circuitry is further configured to determine whether the circuitry has performed the prior registration.

35. The communication apparatus of claim 26, wherein the circuitry is further configured to determine whether to perform the additional registration.

36. The communication apparatus of claim 26, wherein at least one of the first identifier and the second identifier is stored in a memory that is in communication with the circuitry.

37. A communication apparatus, comprising:
  means for receiving a first identifier comprising a first identification portion and a second identification portion, wherein the first identifier is used in a prior registration,
  means for receiving a second identifier that is different than the first identifier comprising a third identification portion and a fourth identification portion, wherein the second identifier is used in an additional registration, and
  means for verifying that the third identification portion comprises at least one of the first identification portion and the second identification portion; and
  means for transmitting data indicative of the verification;
  wherein the first identification portion comprises an instance identifier, the second identification portion comprises a first registration identifier, and the third identification portion comprises a second registration identifier.

38. The communication apparatus of claim 37, wherein the first identifier comprises a first private user identity and the second identifier comprises a second private user identity.

39. The communication apparatus of claim 37, wherein each of the prior registration and the additional registration comprises a record containing Internet Protocol Multimedia System (IMS) registration data.

40. A method for registering a wireless apparatus, the method comprising:
- receiving a first identifier comprising a first identification portion and a second identification portion, wherein the first identifier is used in a prior registration,
- receiving a second identifier that is different than the first identifier comprising a third identification portion and a fourth identification portion, wherein the second identifier is used in an additional registration, and
- verifying that the third identification portion comprises at least one of the first identification portion and the second identification portion; and
- transmitting data indicative of verification;
- wherein the first identification portion comprises an instance identifier, the second identification portion comprises a first registration identifier, and the third identification portion comprises a second registration identifier.

41. The method of claim 40, wherein the first identifier comprises a first private user identity and the second identifier comprises a second private user identity.

42. The method of claim 40, wherein each of the prior registration and the additional registration comprises a record containing Internet Protocol Multimedia System (IMS) registration data.

43. A computer program product, comprising:
non-transitory computer-readable medium comprising:
- code for causing a computer to obtain a first identifier comprising a first identification portion and a second identification portion, wherein the first identifier is used in a prior registration,
- code for causing a computer to obtain a second identifier that is different than the first identifier comprising a third identification portion and a fourth identification portion, wherein the second identifier is used in an additional registration, and
- code for causing a computer to verify that the third identification portion comprises at least one of the first identification portion and the second identification portion; and
- code for causing a computer to transmit data indicative of the verification;
- wherein the first identification portion comprises an instance identifier, the second identification portion comprises a first registration identifier, and the third identification portion comprises a second registration identifier.

44. The computer program product of claim 43, wherein the first identifier comprises a first private user identity and the second identifier comprises a second private user identity.

45. The computer program product of claim 43, wherein each of the prior registration and the additional registration comprises a record containing Internet Protocol Multimedia System (IMS) registration data.

46. A communication apparatus, comprising:
- a receiver configured to receive a current registration request, wherein the current registration request comprises a current public user identity and a current unique identity; and circuitry configured to:
  - determine whether at least one previous registration was successful;
  - determine whether there is at least one public user identity other than the current public user identity, the at least one public user identity being associated with a prior unique identity;
  - determine whether the at least one previous registration has expired;
  - determine whether the current unique identity is the same as the prior unique identity; and
  - initiate a deregistration procedure for the at least one previously registered public user identity being associated with the prior unique identity.

47. The communication apparatus of claim 46, wherein the receiver is further configured to use the prior unique identity with the at least one public user identity in the at least one previous registration.

48. The communication apparatus of claim 46, wherein the unique identity comprises at least one of a medium access control (MAC) address, a International Mobile Subscriber Identity (IMSI), and an international mobile equipment identity (IMEI).

49. The communication apparatus of claim 46, wherein the unique identity is based on, at least in part, at least one of a date, a time, or a number generated by a random number generator.

50. The communication apparatus of claim 46, wherein the public user identity comprises at least one a user name, a domain name, and a phone number.

51. A communication apparatus, comprising:
- means for receiving a current registration request, wherein the current registration request comprises a current public user identity and a current unique identity;
- means for determining whether at least one previous registration was successful;
- means for determining whether there is at least one public user identity other than the current public user identity, the at least one public user identity being associated with a prior unique identity;
- means for determining whether the at least one previous registration has expired;
- means for determining whether the current unique identity is the same as the prior unique identity; and
- means for initiating a deregistration procedure for the at least one previously registered public user identity being associated with the prior unique identity.

52. A method for registering a wireless apparatus, the method comprising:
- receiving a current registration request, wherein the current registration request comprises a current public user identity and a current unique identity;
- determining whether at least one previous registration was successful;
- determining whether there is at least one public user identity other than the current public user identity, the at least one public user identity being associated with a prior unique identity;
- determining whether the at least one previous registration has expired;
- determining whether the current unique identity is the same as the prior unique identity; and
- initiating a deregistration procedure for the at least one previously registered public user identity being associated with the prior unique identity.

53. A computer program product, comprising:
non-transitory computer-readable medium comprising:
- code for causing a computer to receive a current registration request, wherein the current registration request comprises a current public user identity and a current unique identity;
- code for causing a computer to determine whether at least one previous registration was successful;

code for causing a computer to determine whether there is at least one public user identity other than the current public user identity, the at least one public user identity being associated with a prior unique identity;

code for causing a computer to determine whether the at least one previous registration has expired;

code for causing a computer to determine whether the current unique identity is the same as the prior unique identity;

and code for causing a computer to initiate a deregistration procedure for the at least one previously registered public user identity being associated with the prior unique identity.

* * * * *